Patented Sept. 9, 1941

2,255,506

UNITED STATES PATENT OFFICE 2,255,506

EDIBLE CONTAINER FOR ICE CREAM OR THE LIKE

Nello Frediani, Lake Geneva, Wis.

No Drawing. Application June 5, 1939, Serial No. 277,449

4 Claims. (Cl. 99—136)

This invention relates to an edible container for ice cream or the like.

It is one of the objects of this invention to provide a container of this character which will be highly impervious to moisture and yet maintain that degree of flavor and taste required by the consumer.

Heretofore, it has been the endeavor and desirability in the art of manufacturing ice cream containers, to render the container impervious to moisture to the extent that the container will substantially maintain its rigidity over a considerable period of time without becoming soggy or otherwise soft and dough-like due to the melting of the contents thereof or to humidity or analogous causes.

In the endeavors to this accomplishment, it is the normal practice of the manufacturer of containers of this character, to coat the walls of the container with a protective liquid not injurious to the consumer. Coating the walls of the container with this liquid for the purpose stated, requires a suitable handling of the cone prior to the application of the liquid, as well as liquid spraying or coating apparatus and means, all of which tends to add to the cost of manufacture of the container. Also, it has been found in actual practice that a cone containing uneven surfaces or roughened bodies will be only partially coated with the liquid, and consequently minute exposed surfaces remain which permit the moisture to penetrate from within the container and result in a sogging or otherwise breaking down of the rigidity of the same.

In my improved edible container, which is designed especially, although not necessarily, to contain ice cream, the moisture-repellent medium is an ingredient thoroughly mixed and commingled with the other ingredients making up the cone, and I have found by actual experience that by commingling the moisture-repellent medium with the other ingredients of the cone, there results a container which possesses a proper appeal and flavor. In carrying out the method of manufacture of my container, there is no excessive rehandling of the same or material expense added in its production.

Other objects of my invention will appear from the description to follow.

In manufacturing the container forming the subject matter of my invention, I break down an edible product, preferably, though not necessarily, cereal flakes or an ice cream cone proper which is in the nature of a panified product including farinaceous or cereal matter, into a fine or substantially fine powder. I prefer to take the usual ice cream cone and reduce the same to a powder, mixing into this powder the moisture-preventing or repellent ingredient, which preferably is in the form of cocoa butter, coconut butter or other fats or edible oleaginous substance, powdered sugar and powdered milk. The powdered milk serves to balance the mixture and give it a pleasing taste. This mixture is thoroughly stirred so that the ingredients are properly commingled. As indicated, the cocoa butter serves as a moisture-preventing medium. The sugar serves to sweeten the mixture to a desired degree. This mixture, when brought to a substantially putty-like consistency is then poured or otherwise placed into a properly formed mold, preferably in the shape of an ordinary ice cream cone, after which the container thus formed receives its contents of ice cream and then is placed in a refrigerator where the ice cream cone is maintained in a hardened state or condition until consumed.

In forming the cone in the manner herein stated, the moisture-preventing medium, the cocoa butter or the like, is evenly distributed throughout the cone body and does not merely, as in the old method, cover the surface thereof. The finished product is pleasing in appearance, free from discoloration due to uneven spraying or commixing of the moisture-preventing medium, as results in the case where the cone surfaces are sprayed or otherwise coated with a moisture-repellent protective coating.

If desired, flavors may be added to the mixture so as to reduce the taste of the cocoa butter. The sugar may be varied in quantity so as to increase or limit the sweetness of the mass when completed in molded form.

In the manufacture of my ice cream container, I do not want to be limited to material from which the ordinary ice cream cones are formed. Therefore, the container may be formed of any edible ingredient capable of being reduced to a pulverized or powdered form.

The various advantages and objects of the invention may be accomplished by modifications of the particular method and embodiment specifically described herein, and it is intended that the appended claims shall include all equivalent arrangements and methods fairly coming within their call.

Having thus described my invention, what I claim as new and desire to protect by Letters Patent is:

1. The method of making a container for ice cream consisting of mixing with an edible pulverized mass of cereal a moisture-repellent edible fat, then placing the mass in a mold to shape the same into a container form, and subjecting said form to refrigeration.

2. The method of making an ice cream cone type of confection which comprises mixing with a mass of pulverized panified matter a moisture-repellent agent consisting of cocoa butter and sugar, then placing the mass in a mold to shape the same into a container form, then placing ice cream in said container and subjecting the container to refrigeration.

3. The method of producing a container for ice cream consisting of breaking the panified dough of which ice cream cones are made down into a powdered or pulverized form, adding to said powder an edible oleaginous moisture-repellent agent in a quantity which renders the powder of a putty-like consistency, and then placing the mixed mass into a mold to shape the same into container form.

4. The method of producing a container for ice cream consisting of breaking an edible ice cream cone down into a powdered or pulverized form, adding to said powder a moisture-repellent agent consisting of cocoa butter and sugar in a quantity which renders the powder of a putty-like consistency, and then placing the mixed mass into a mold to shape the same into container form.

NELLO FREDIANI.